(12) United States Patent
Goyal et al.

(10) Patent No.: US 8,405,277 B2
(45) Date of Patent: Mar. 26, 2013

(54) ACTUATOR

(75) Inventors: Amita Goyal, Tokyo (JP); Jun Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 13/196,676

(22) Filed: Aug. 2, 2011

(65) Prior Publication Data

US 2012/0032553 A1 Feb. 9, 2012

(30) Foreign Application Priority Data

Aug. 6, 2010 (JP) ................... 2010-177315

(51) Int. Cl.
*H01L 41/08* (2006.01)
(52) U.S. Cl. ......... 310/300; 310/311; 310/331; 310/332
(58) Field of Classification Search .................. 310/300, 310/311, 328, 330–332
See application file for complete search history.

(56) References Cited

U.S. PATENT DOCUMENTS

| | | | | |
|---|---|---|---|---|
| 4,330,730 A * | 5/1982 | Kurz et al. ................ | 310/331 |
| 5,889,354 A * | 3/1999 | Sager ...................... | 310/331 |
| 6,555,945 B1 * | 4/2003 | Baughman et al. .......... | 310/300 |
| 7,364,418 B2 * | 4/2008 | Masuda et al. ............. | 418/142 |
| 2007/0104604 A1 * | 5/2007 | Masuda et al. ............. | 418/55.2 |
| 2009/0082723 A1 * | 3/2009 | Krogh et al. .............. | 604/95.05 |
| 2011/0098643 A1 * | 4/2011 | Chiang et al. ............. | 604/131 |
| 2012/0032553 A1 * | 2/2012 | Goyal et al. .............. | 310/300 |

FOREIGN PATENT DOCUMENTS

JP 2002-303303 A 10/2002

* cited by examiner

*Primary Examiner* — Mark Budd
(74) *Attorney, Agent, or Firm* — Canon U.S.A., Inc. IP Division

(57) ABSTRACT

An expansion and contraction actuator has a first long actuator portion and a second long actuator portion that face each other and connection members that connect the long sides of each of the first long actuator portion and the second long actuator portion to each other, in which a part of the first long actuator portion and a part of the second long actuator portion are apart from each other to thereby form a hollow structure, the first long actuator portion and the second long actuator portion each have a pair of long electrodes and a long electrolyte layer having an electrolyte, long internal electrodes thereof are the same cathode or anode electrodes, long external electrodes thereof are counter electrodes thereto, and the actuator expands and contracts in the direction of the screw axis by voltage application.

6 Claims, 5 Drawing Sheets

ACTUATOR

BACKGROUND OF THE INVENTION

1. Field of the Invention

The present invention relates to an actuator and specifically relates to a polymer actuator which has a spiral structure and which expands and contracts.

2. Description of the Related Art

In various industrial fields, such as medical treatment, welfare, robot, and electronics, a soft actuator that is small and light weight, has good affinity with humans, and has flexible motion characteristics as in living creatures has been demanded.

As such a technique, the polymer actuator is one of promising choices. Known as the polymer actuator are a gel actuator, an ion exchange resin film-metal composite (IPMC) actuator, a composite actuator of polymer and CNT (carbon nanotube), and the like and the polymer actuator expands and contracts by converting electrical energy to mechanical energy.

Japanese Patent Laid-Open No. 2002-303303 discloses an expansion and contraction actuator having a structure in which an endless tubular tube is spirally wound. The actuator expands and contracts as a whole along the direction of the screw axis by changing the pressure of fluid introduced into the tube to thereby change the diameter of the tube. The application to medical use is assumed for flexible movement properties.

However, the actuator utilizing the pressure of a fluid as described in Japanese Patent Laid-Open No. 2002-303303 has a structure in which a rubber tubular material is used and portions other than both ends are sealed. More specifically, as long as a fluid is used, a strong structure for preventing the leak of the fluid becomes indispensable. Moreover, the introduction of the fluid into the tube requires peripheral devices, such as a compressor or a valve, which increases the size and weight, resulting in poor portability.

The tube diameter changes along the direction in which the fluid flows, and therefore the movement becomes nonuniform in the upper stream and the lower stream of the fluid. Furthermore, in terms of the structure, a higher load is likely to be applied to high pressure-loss portions in the tube, so that portions where a load is likely to be locally applied generate in driving, which has caused a problem with durability.

SUMMARY OF THE INVENTION

The present invention provides a spiral expansion and contraction actuator that can be reduced in size and weight and has high durability.

The actuator according to the invention is a long and spiral composite actuator, and the composite actuator has a first long actuator portion and a second long actuator portion that face each other and connection members that connect the long sides of each of the first long actuator portion and the second long actuator portion to each other, in which a part of the first long actuator portion and a part of the second long actuator portion are apart from each other to thereby form a hollow structure, the first long actuator portion and the second long actuator portion each have a pair of long electrodes and a long electrolyte layer having an electrolyte, a long internal electrode of the first long actuator portion and a long internal electrode of the second long actuator portion are the same cathode or anode electrodes, a long external electrode of the first long actuator portion and a long external electrode of the second long actuator portion are counter electrodes to the cathode or anode electrodes, and the actuator expands and contracts in the direction of the screw axis by voltage application between the electrodes.

The invention can provide a small and lightweight expansion and contraction actuator which does not require a sealing structure because a fluid is not used and in which peripheral devices can be sharply simplified.

Moreover, the changes in the diameter of a spiral occur in a synchronized manner as a whole, and thus the force generated by expansion and contraction entirely and simultaneously arises toward the direction of the screw axis. Therefore, an actuator free from local portions to which a load is applied by driving and local material exhaustion can be provided.

Further features of the present invention will become apparent from the following description of exemplary embodiments with reference to the attached drawings.

DESCRIPTION OF THE EMBODIMENTS

Embodiments in an actuator of the invention will be described in detail with reference to the drawings.

Figure 1A:
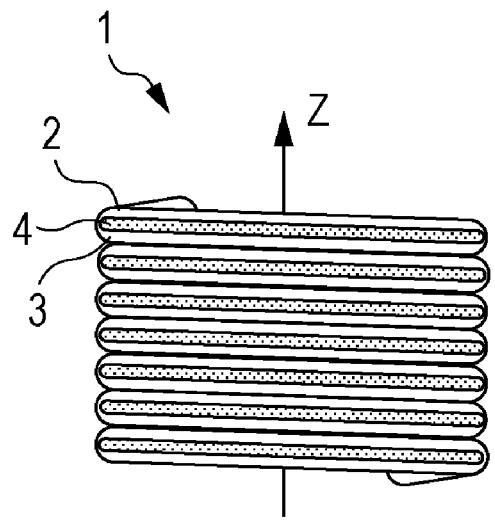
FIGS. 1A and 1B are general views illustrating the structure of an actuator of an embodiment of the invention.
Figure 1B:
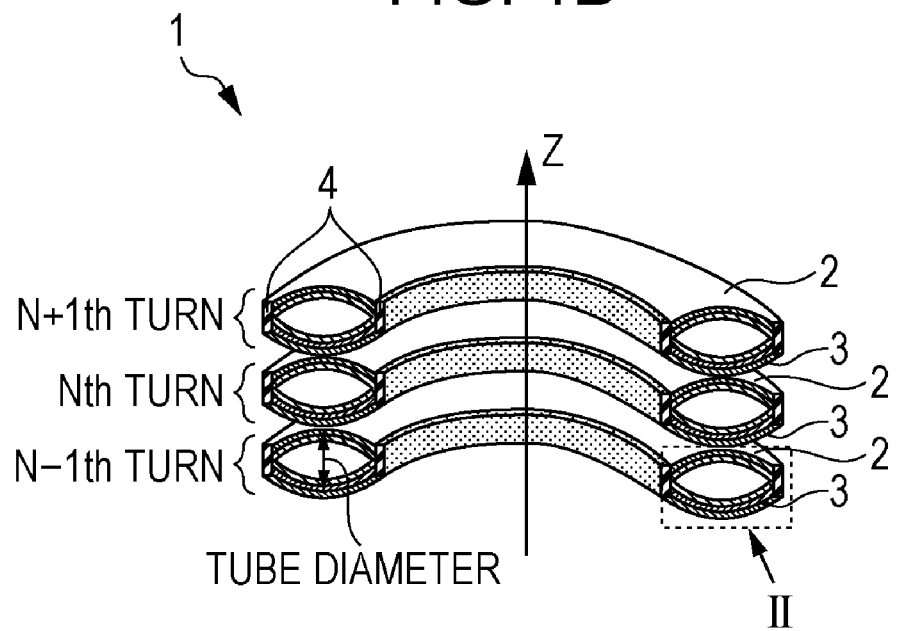
Figure 2A:
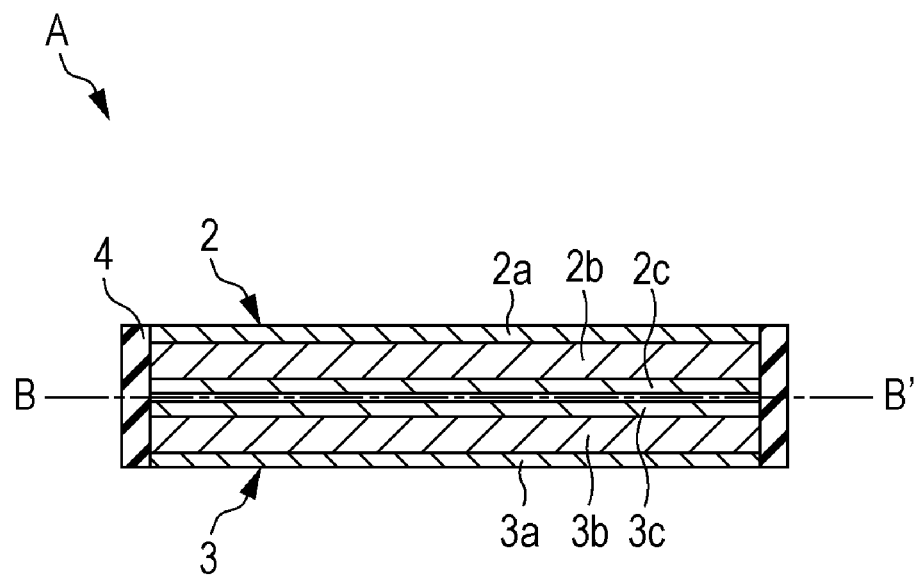
FIGS. 2A and 2B are general views illustrating the region II of FIG. 1.
Figure 2B:
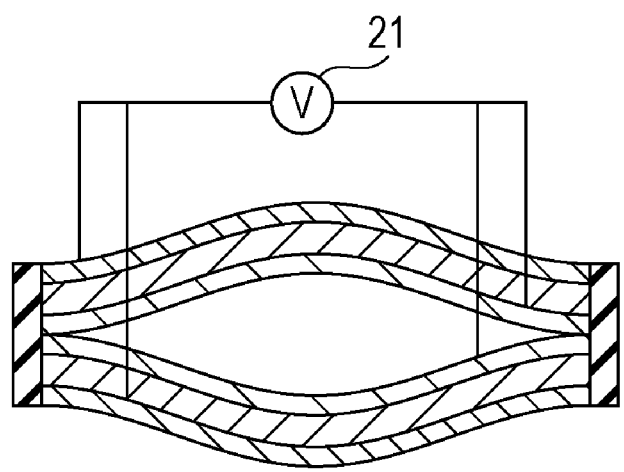
Figure 3A:
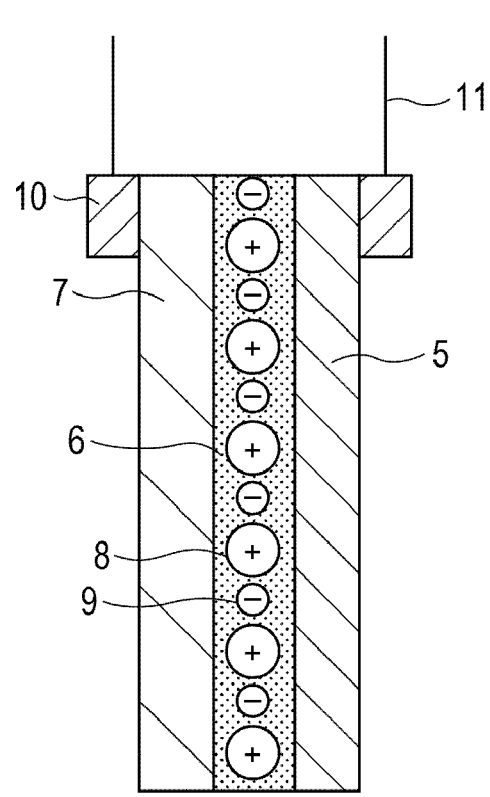
FIGS. 3A and 3B are schematic views illustrating the movement of an ion movement type polymer actuator.
Figure 3B:
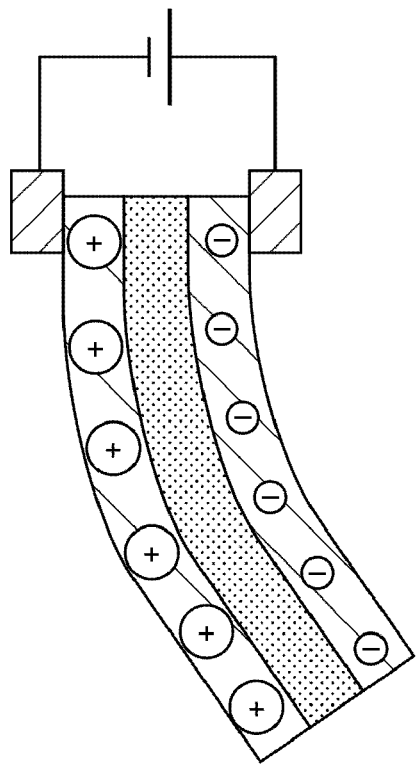
Figure 4:
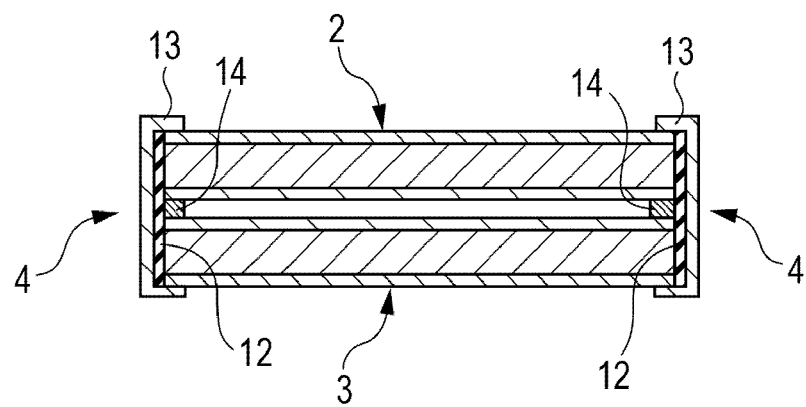
FIG. 4 is a general view illustrating the region II describing the structure of a connection member in an embodiment of the invention.

A spiral composite actuator 1 of the invention is constituted as a composite actuator in which at least two polymer actuators are compounded. FIG. 1A is an outline view of the spiral composite actuator 1 and FIG. 1B illustrates a portion corresponding to three turns of the turns of the spiral among the cross sectional views obtained by cutting FIG. 1A at the plane including the screw axis Z. FIGS. 2A and 2B are views describing the region II of FIG. 1B. FIGS. 3A and 3B are schematic views describing the movement principle of the polymer actuator. FIG. 4 is a general view describing the structure of a connection member which is a constituent component of the spiral composite actuator.

The width (maximum distance) of the distance between the most remote points of the hollow structure formed by a first long actuator portion 2 and a second long actuator portion 3 of the spiral composite actuator illustrated in FIG. 1B is hereinafter referred to as the tube diameter.

Hereinafter, the invention will be described in detail with reference to each embodiment.

First Embodiment

The spiral composite actuator 1 according to a first embodiment of the invention has a structure in which the long sides of each of the two long actuator portions 2 and 3 are connected through connection members 4 as illustrated in FIGS. 1A and 1B. The spiral composite actuator 1 has a structure in which the long actuator portions 2 and 3 with the connection members are wound around the screw axis Z. In the long actuator portions 2 and 3 connected to each other at both ends of the long sides, portions other than the connection members are not connected to each other, and thus a hollow structure can be formed as in a tube.

By applying electrical energy to the long actuator portions 2 and 3 in such a manner as to bend in opposite directions to each other, the long actuator portions 2 and 3 mutually bend in the direction of changing the diameter of the hollow portion, i.e., in such a manner as to change the maximum distance therebetween. Due to the fact that the bending movement acts as the entire actuator, the actuator expands and contracts in the direction along the screw axis Z.

The structures and materials of the long actuator portions 2 and 3 may be the same or different. This embodiment describes the case where the long actuator portions 2 and 3 contain the same structure and materials.

Usable as the polymer actuator are generally known various materials, such as elastomer materials, ion conductive materials, conductive polymer materials, and carbon nanotube (CNT) materials. As the basic structure of these polymer actuators, an ionic substance is held by electron conductors (electrodes). It is known that the polymer actuators bend or expand and contract as a device in response to voltage application between electrodes due to the attraction between the electrodes, volume changes associated with the movement of ions, electrostatic repulsion, or the like.

As these ion movement type polymer actuators, it is suitable to use a polymer gel for flexibility of devices and it is more suitable to use a CNT gel actuator containing a CNT and an ionic liquid. This is because the CNT has a high Young's modulus, has a high internal stress, and further can stably move in the air due to nonvolatility of the ionic liquid.

FIGS. 3A and 3B are schematic views illustrating the movement of an ion movement type polymer actuator and illustrates the cross section in the film thickness direction, in which one end serves as a fixed portion and an energizing portion.

In FIG. 3A, the polymer actuator has a pair of electrode layers 5 and 7 and a long electrolyte layer 6 having an electrolyte disposed between the pair of electrode layers, in which one end is fixed with a terminal electrode portion 10. The terminal electrode portion 10 is connected to an external power supply through a wiring 11. As shown in FIG. 3B, when a voltage is applied to the pair of electrode layers, electrolytes (cations 8 or/and anions 9) in the electrolyte layer move into the electrode layers to thereby change the volume of the electrode layers. When a volume difference arises between the electrode layers due to a difference in bulkiness between the cations 8 and the anions 9, the actuator exhibits movement, such as bending, as a whole.

By the application of these principles, in the actuator of this embodiment, two long polymer actuators are stacked in such a manner as to face each other as illustrated in FIGS. 2A and 2B for use. FIGS. 2A and 2B are cross sectional views of a surface perpendicular to the longitudinal direction. The structure allows changes in the maximum distance therebetween by the input of electrical energy to thereby change the tube diameter of the spiral.

The long actuator portions 2 and 3 each have a structure in which long electrolyte layers (2b, 3b) are held by long electrodes and each have long internal electrodes (2c, 3c) facing each other and long external electrodes (2a, 3a) not facing each other.

When a voltage is applied in such a manner that the long internal electrodes (2c, 3c) facing each other and the long external electrodes (2a, 3a) not facing each other each in the long actuator portions 2 and 3 have the same polarity (cathode or anode electrodes), the maximum distance therebetween is changed by the bending movement as illustrated in FIG. 3. The anode and the cathode as used herein define the direction of current flowing into the actuator, and the current flows into the cathode from the anode. The direction through which current flows is changed by switching the anode and the cathode.

More specifically, the long internal electrode 2c of the first long actuator portion and the long internal electrode 3c of the second long actuator portion are the same cathode or anode electrodes. In contrast, the long external electrode 2a of the first long actuator portion and the long external electrode 3a of the second long actuator portion are counter electrodes thereto, and a voltage is applied between the electrodes. The counter electrode is an anode electrode when the internal electrode is a cathode electrode or a cathode electrode when the internal electrode is an anode electrode. A potential to be applied to each of the cathode electrode may be a potential of reverse polarity to each of anode electrode or either one of them may function as a ground electrode. Or, the potential may be a potential of the same polarity and a potential difference may arise.

By the application of voltage in a cathode-anode relationship between these electrodes, the composite actuator 1 expands and contracts in the direction of the screw axis Z.

An arbitrary potential may be applied to each electrode layer. However, the long internal electrodes (2c, 3c) and the long external electrodes (2a, 3a) suitably have the same potential because such a state is simple in terms of control.

The long actuator portions 2 and 3 each may have one continuous structure or may have a structure in which the long actuator portions 2 and 3 each are divided at arbitrary positions. In this case, the respective divided actuators need to be electrically connected by the connection members 4, and each connection, i.e., each entire line, is regarded as each of the long actuator portions 2 and 3.

The maximum distance becomes large in the direction perpendicular to the B-B' line illustrated in FIG. 2A, and thus the actuator contracts in the direction horizontal to the B-B' line.

The B-B' surface where the long actuator portions 2 and 3 face each other is referred to as a facing surface. In usual, the connection members 4 are present in the facing surface and the long actuator portions having the maximum distance are present at a position most remote from the facing surface.

The connection member 4 is equivalent to the terminal electrode in FIG. 3.

The long actuator portions 2 and 3 are connected and fixed through the connection members 4. By the two connection members 4, the long sides of each of the long actuator portions 2 and 3 are connected to each other.

The connection members 4 may have one continuous structure or may have a structure in which the connection members are divided at arbitrary portions.

The connection by the connection members 4 may be mechanical connection by pressure bonding or crimping or chemical connection using adhesives or the like.

The connection member 4 may only have a function of mechanically fixing the long actuator portions or may have an electrical contact point and may have a function of applying a voltage to each of the electrode layers of the long actuator portions. Suitably, the connection member 4 has a function of connecting and energizing as illustrated in FIG. 4. In this case, it is more suitable for the connection member 4 to have a structure in which an insulating member and a conductor are patterned.

By the use of the connection members 4 having a structure in which external conductive members 13 contacting the long external electrodes (2a, 3a) and internal conductive members 14 contacting the long internal electrodes (2c, 3c) are electrically insulated by the insulating members 12 as illustrated in FIG. 4, electrical connection is achieved in addition to mechanical connection when connecting the long actuator portions 2 and 3.

Due to the connection members 4 having the structure, the long external electrodes (2a, 3a) and the long internal electrodes (2c, 3c) of the long actuator portions 2 and 3 each can be maintained at the same potential.

When the connection members 4 having the structure are continuously formed in the longitudinal direction, the contact points of the long actuator portions and the external power supply can be centralized to the connection members 4.

The connection members 4 suitably contain soft materials in such a manner as to follow the changes in the maximum distance between the long actuator portions 2 and 3 and the expansion and contraction motion in the direction along the screw axis Z of the spiral composite actuator 1. Or, an aspect is suitable in which the connection members 4 can structurally follow the expansion and contraction motion as in a spring.

A certain polarity is applied in a state where the potential of each of the long internal electrodes (2c, 3c) facing each other in the long actuator portions 2 and 3 is the same potential and a reverse polarity is applied in a state where the potential of each of the long external electrodes (2a, 3a) not facing each other is the same potential. Thus, the maximum distance between the long actuator portions 2 and 3 changes to thereby change the hollow structure formed by the long actuator portions 2 and 3, i.e., the tube diameter of the spiral. The spiral composite actuator 1 can expand and contract in the direction of the screw axis in response to the change.

One turn of the spiral can be regarded as one unit (unit) as partially viewed. More specifically, it can be said that the actuator is constituted by a connected body of units (N−1th turn unit, Nth turn unit, and N+1th turn unit) of the long actuator portions adjacent to each other illustrated in FIG. 1B.

For the connection of each unit, the units may be connected to each other or simply contact each other without being connected insofar as the changes in the tube diameter of the spiral are transmitted to each other.

The facing surface of each unit of the long actuator portions 2 and 3 may be directed in an arbitrary direction.

The facing surface of each unit may be a direction in parallel to the screw axis Z, may be a direction almost perpendicular thereto, may have an arbitrary angle, or may be twisted at an arbitrary portion.

In particular, as illustrated in FIG. 1B, when the facing surface of each unit of the long actuator portions is perpendicular (i.e., the direction of the normal line of the facing surface and the Z axis direction are the same) to the screw axis Z, the spiral composite actuator 1 that is driven in the expansion direction can be formed by achieving a state where the tube diameter is enlarged on voltage application from a flat state before voltage application.

It is a matter of course that the structure can also be designed in such a manner as to return the state where the tube diameter is enlarged by bending, which is the state before the voltage application, to the flat state by the voltage application. In this case, the spiral composite actuator 1 that is driven in a contraction manner along the screw axis Z can be formed.

According to this embodiment, a small and lightweight expansion and contraction actuator in which a strong sealing structure, peripheral devices, and the like as are seen in a fluid actuator are sharply omitted.

The changes in the tube diameter of a spiral occur in a synchronized manner irrespective of the stacking direction, and thus the movement becomes more uniform. Therefore, a portion to which load is likely to be applied in driving is canceled, and thus local material exhaustion can be reduced.

The long internal electrodes (2c, 3c) facing each other in the long actuator portions 2 and 3 have the same potential and thus the long internal electrodes may contact each other. Similarly, the long external electrodes (2a, 3a) not facing each other in the long actuator portions 2 and 3 have the same potential, and thus the long external electrode 2a of the long actuator portion 2 of the unit of the Nth turn and the long external electrode 3a of the long actuator portion 3 of the unit of the N+1th turn may contact each other to the stack of units of the long actuator portions. Thus, according to this embodiment of the invention, the structure of the electrical contact point for the integration of a polymer actuator can be sharply simplified and the productivity is also excellent.

Hereinafter, each material and each structure will be described in detail with respect to the spiral composite actuator 1 and the long actuator portions 2 and 3.

Structure of Polymer Actuator

The polymer actuator is an actuator that contains an electrolyte and that deforms due to the movement of ions in the electrolyte. On both surfaces of an electrolyte layer containing an electrolyte and a polymer, an electrode layer containing a conductive material, an electrolyte, and a polymer is formed. Each layer has flexibility and is formed into a rectangular shape. Each layer can be arbitrarily formed into a film as a bulk, a film obtained by the accumulation of fiber structures, or the like. In both the electrode layers, the materials and the structures may be the same or different from each other.

Constituent Materials of Polymer Actuator

Typical materials will be described for members constituting the polymer actuator.

Electrolyte Layer

The long electrolyte layer is a flexible material containing an electrolyte (i.e., substance exhibiting ionicity in a molten state) and a polymer, and is a nonionic polymer compound containing ionic substances, or an ionically conductive polymer compound. In the case of these materials, when charges move under an electrical field and current flows, the ions serve as carriers for the charges.

As the polymer, fluorine containing polymers, such as tetrafluoroethylene and polyvinylidene fluoride; polyolefin polymers, such as polyethylene and polypropylene; polybutadiene compounds; polyurethane compounds, such as elastomer or gel; silicone compounds; thermoplastic polystyrene; polyvinyl chloride; polyethylene terephthalate, and the like can be mentioned, for example.

These substances may be used singly or in combination of two or more kinds thereof, may form a functional group, or may form a copolymer with other polymers.

As the ionic substances contained in these polymers, lithium fluoride, lithium bromide, sodium bromide, magnesium chloride, copper sulfate, sodium acetate, sodium oleate, sodium acetate, and the like can be mentioned, for example.

It is suitable to use an ionic liquid as the ionic substances because the durability in driving in the air increases.

Here, the ionic liquid is one also referred to as an ordinary temperature molten salt or simply referred to as a molten salt and is a salt exhibiting a molten state in a wide temperature range including ordinary temperature (room temperature) and is a salt exhibiting a molten state at, for example, 0° C., suitably −20° C., and more suitably −40° C. The ionic liquid is suitably one having higher ion conductivity.

Various kinds of known ionic liquid can be used for the ionic liquid and a stable one exhibiting a liquid state in an actual use temperature range is suitable. Mentioned as a suitable ionic liquid are imidazolium salt, pyridinium salt, ammonium salt, phosphonium salt, and the like and the substances may be used singly or in combination of two or more kinds thereof.

Suitably mentioned as the electrolyte layer of the invention is one in which the ionic liquid is used for the electrolyte and a polyvinylidene fluoride-hexafluoro propylene copolymer [PVDF (HFP)] or polyvinylidene fluoride (PVDF) is used for the polymer.

Electrode

The electrode contains a flexible electrode containing a composite of a conductive material and a polymer or a flexible thin layer electrode containing a conductive material.

The conductive material is not particularly limited insofar as the actuator performance is adversely affected. Mentioned as the conductive materials are various carbon materials, such as black lead, carbon black, acetylene black, Ketjenblack, carbon whisker, carbon fiber, carbon nanotube, and carbon microcoil, powder (fine particles) of metals (e.g., platinum, palladium, ruthenium, silver, iron, cobalt, nickel, copper, indium, iridium, titanium, and aluminum), metallic compounds (e.g., tin oxide, zinc oxide, indium oxide, stannic oxide, and ITO), metal fibers, conductive ceramic materials, conductive polymer materials, and the like. The electrode contains one of the conductive materials or a mixture thereof.

As the conductive materials of the invention, carbon materials having a nano-structure are suitable and particularly suitably a carbon nanotube (CNT) from the viewpoint of conductivity and specific surface area. A CNT gel of the carbon nanotube and the ionic liquid has advantages in that a CNT bundle forms a gel by self organization with the ionic liquid and the CNT is effectively dispersed, and thus is extremely suitable as electrode materials.

The polymer contained in the electrode is not particularly limited insofar as the polymer has flexibility with which the polymer can follow the movement of the actuator and suitably has less hydrolysis properties and is stable in the atmosphere.

As such a polymer, polyolefin polymers, such as polyethylene and polypropylene; polystyrene; polyimide; polyarylenes (aromatic polymers), such as polyparaphenylene oxide, poly(2,6-dimethylphenylene oxide), and polyparaphenylene sulfide; polymers obtained by introducing a sulfonic acid group (—$SO_3H$), a carboxyl group (—COOH), a phosphate group, a sulfonium group, an ammonium group, a pyridinium group, and the like into polyolefin polymers, polystyrene, polyimide, polyarylenes (aromatic polymers), and the like; fluorine containing polymers, such as polytetrafluoroethylene and polyvinylidene fluoride; a perfluoro sulfonic acid polymer, a perfluoro carboxylic acid polymer, a perfluoro phosphoric acid polymer, and the like obtained by introducing a sulfonic acid group, a carboxyl group, a phosphate group, a sulfonium group, an ammonium group, a pyridinium group, and the like into the frame of fluorine containing polymers; polybutadiene compounds; polyurethane compounds, such as elastomer or gel; silicone compounds; polyvinyl chloride; polyethylene terephthalate; nylon; polyarylate, and the like can be mentioned.

Moreover, polymers having conductivity can also be used. Such polymers are not particularly limited and, for example, polyaniline, polypyrrole, polythiophene, polyacetylene, polyphenylene, and the like can be mentioned.

These substances may be used singly or in combination of two or more kinds thereof, may form a functional group, or may form a copolymer with other polymers.

The above-described polymers are suitably polymers having a high compatibility with the electrolyte layer. Due to the fact that the compatibility and bonding properties with the electrolyte layer are high, an electrode firmly stuck thereto can be constituted. Therefore, the polymer is suitably a polymer having a polymer structure similar to or the same as that of the polymer compound constituting the electrolyte layer or a polymer having a functional group similar to or the same as that of the polymer compound constituting the electrolyte layer.

The electrode may be formed as a thin metal layer by plating, vapor deposition, sputtering, or the like. When directly forming such an electrode on the electrolyte layer, it may be regarded that the electrode is formed only with conductive materials.

Suitably mentioned as the electrode of the invention is a gel-like electrode obtained by kneading a CNT which is a conductive material, an ionic liquid, and PVDF.

Bonding of Electrolyte Layer and Electrode

The long actuator portions 2 and 3 are formed by bonding of the long electrolyte layer and the electrodes.

The electrolyte layer and the electrodes are uniformly cut into an arbitrary shape and an arbitrary size. A method for forming the polymer actuator 1 is, not particularly limited to, a method for disposing the electrode on each of both surfaces of the electrolyte layer in a holding manner and heating and pressurizing the same can be suitably used.

The temperature, pressurizing pressure, and time of the heating and pressurizing process are, not particularly limited insofar, selected such that the temperature is equal to or lower than the decomposition temperature of a polymer binder and may be selected as appropriate depending on the polymer binder to be used, the polymer compound constituting the actuator, the type of moving ions, and the like. For example, the temperature of the heating and pressurizing process is suitably 30° C. or more and 150° C. or lower. The pressurizing pressure is suitably 1 kg/$cm^2$ or more and 100 kg/$cm^2$ or lower and more suitably 10 kg/$cm^2$ or more and 50 kg/$cm^2$ or lower.

In addition, a method for forming a thin metal layer on the surface of the electrolyte layer by plating, vapor deposition, sputtering, or the like may be acceptable.

Water, an ionic substance, an ionic liquid, or a mixture thereof is immersed in the polymer actuator after manufacturing an element, the polymer actuator may be immersed in a solution thereof. Here, the concentration of the solution in which the actuator is immersed and the immersion time are not particularly limited and known former methods may be used.

Connection of Long Actuator Portions

The long actuator portions 2 and 3 are connected to each other at the long sides through the connection members 4. A suitable structure of the connection members 4 is a structure in which the external conductive members 13 and the internal conductive members 14 are patterned by the insulating members 12 as illustrated in FIG. 4.

The long external electrodes (2a, 3a) of the long actuator portions 2 and 3 contact the external conductive members 13 and the long internal electrode (2c, 3c) contact the internal conductive members 14. Thus, the long external electrodes (2a, 3a) and the long internal electrodes (2c, 3c) of the long actuator portions 2 and 3 each can be maintained at the same potential.

As materials of the external conductive members 13 and the internal conductive members 14 of the connection members 4, various conductive materials, such as metal and carbon, are applicable. As materials of the insulating members 12, various insulating materials, such as rubber, resin, ceramics, and glass, are applicable.

The connection members 4 suitably contain flexible materials in such a manner as to follow the changes in the distance between the long actuator portions 2 and 3 and the expansion and contraction motion in the direction along the screw axis Z of the spiral composite actuator 1. Therefore, as materials of the external conductive members 13 and the internal conductive members 14, a structure in which conductive particles are dispersed in the skeleton of flexible polymers or a flexible metal thin layer is suitable similarly as in the electrode layer of the polymer actuator. Similarly, it is suitable to use materials containing flexible insulating polymers, such as rubber, also for the insulating members 12.

The patterning of the external conductive members 13 and the internal conductive members 14 is performed in disposing the same on the insulating members 12. It is also possible to use various kinds of techniques, such as plating, sputtering, or spraying. For secure electrical patterning, the resistance of the insulating members 12 is suitably $10^3$ Ωm or more and $10^{18}$ Ωm or lower or the electrical resistance between the external conductive members 13 and the internal conductive members 14 is suitably 1 kΩ or more.

The connection member 4 contains the insulating members 12, the external conductive members 13, and the internal conductive members 14 and is formed into a T shape in the cross-sectional shape, for example. The external conductive members 13 are patterned into the horizontal line of the T shape and the internal conductive members 14 are patterned into the vertical line of the T shape. By disposing the long actuator portions 2 and 3 in such a manner as to sandwich the internal conductive members 14, and then folding-back the external conductive member 13 to the long actuator portion side, mechanical connection and electrical connection are simultaneously performed. When a similar structure can be achieved, the structure of the connection members 4 is not limited.

Production of Spiral Structure

The long actuator portions 2 and 3 unitized by the connection members 4 are wound around the screw axis Z to thereby form the spiral composite actuator 1. When the units of the long actuator portions are wound around a body of rotation having a guide, it is relatively easy to form the facing surface of each unit perpendicularly to the screw axis. In this case, by heating near the glass transition temperature of the polymer material, the shape can be more easily changed by the external pressure.

The units of the long actuator portions may be connected by the adjacent electrode layers (2a, 3a). Or, the units of the long actuator portions may be connected by the adjacent connection members 4. When the changes in the tube diameter of the spiral can be transmitted to the adjacent unit, the units are not always necessarily connected.

The size of the spiral composite actuator 1 of the invention can be selected as appropriate according to the intended use. For example, a spiral composite actuator having a cross section in which the diameter of the spiral is 1 mm or more and 10 cm or lower and having a length in the Z axis direction of the spiral of 1 mm or more and 10 cm or lower can be produced.

Driving of Spiral Composite Actuator

As illustrated in FIG. 2B, an external power supply 21 is connected to the spiral composite actuator 1 through the connection members 4, and a voltage is applied between the long external electrodes (2a, 3a) and the long internal electrodes (2c, 3c) of the first and second long actuator portions (2, 3).

The long actuator portions 2 and 3 bend in response to the movement of the electrolyte in response to the voltage application.

By the movement, the long actuator portions 2 and 3 change the maximum distance therebetween to thereby change the tube diameter of the spiral.

Due to the fact the changes arise along the longitudinal direction, the tube diameter of the spiral uniformly changes as a whole and the changes are transmitted to the adjacent units, so that the spiral composite actuator 1 expands and contracts along the screw axis.

When the facing surface of each unit of the long actuator portions is perpendicular to the screw axis as in this embodiment, the spiral composite actuator 1 that is driven in the expansion direction can be formed by achieving a state of enlarging the tube diameter on voltage application from the flat state before voltage application. Due to the structure of the spiral composite actuator 1, high displacement in the expansion direction along the screw axis and extraction of the force pushing in the expansion direction can be achieved.

It is a matter of course that the structure can also be designed to return the state where the tube diameter is enlarged by bending, which is the state before the voltage application, to the flat state by the voltage application. In this case, the spiral composite actuator 1 that is driven in a contraction manner along the screw axis Z is obtained.

It is also possible to form an expansion and contraction actuator that can arbitrarily perform extension movement and contraction movement, in which the state before voltage application is a state between the above-described two structures (state where the tube diameter is somewhat enlarged by bending) and the flat state is achieved by voltage application of one polarity and the bending state is achieved by voltage application of reverse polarity.

Second Embodiment

As a modification of the first embodiment, a spiral composite actuator 1 can also be formed by winding the facing surface of each unit in the direction along the screw axis Z, i.e., the direction in parallel to the screw axis.

Figure 5A:
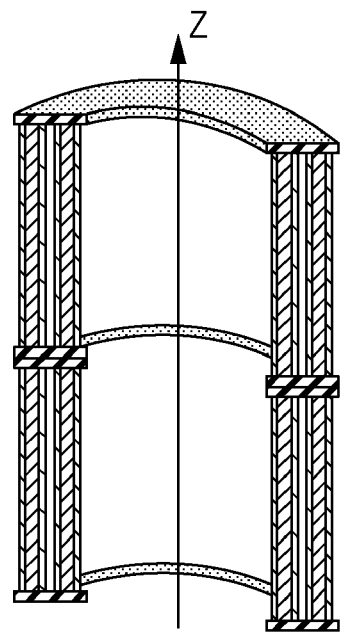
FIGS. 5A and 5B are general views illustrating the structure of an actuator of a second embodiment of the invention.
Figure 5B:
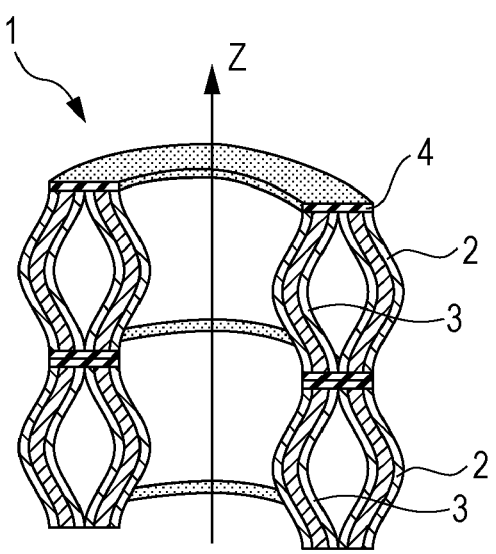

FIG. 5 illustrates a portion corresponding to two turns of the turns of the spiral among the cross sectional views obtained by cutting the spiral composite actuator 1 at the plane including the screw axis Z. FIG. 5A illustrates the state before voltage application and FIG. 5B illustrates the state in voltage application when the facing surface of each unit is wound around the screw axis. More specifically, the facing surface of each unit has a region that spreads always in the direction perpendicular to the screw axis.

As illustrated in FIGS. 5A and 5B, the spiral composite actuator 1 changes the tube diameter of the spiral by the changes in the distance between the long actuator portions 2 and 3 in response to voltage application. Due to the fact that the changes arise along the longitudinal direction, the tube diameter of the spiral uniformly changes as a whole and the changes are transmitted to the adjacent units, so that the spiral composite actuator 1 expands and contracts along the screw axis.

The long actuator portions 2 and 3 do not bend before voltage application and are in a flat state as units, and bend by voltage application to enlarge the maximum distance. The maximum distance becomes large in the direction perpendicular to the B-B' line illustrated in FIG. 2A, and thus the actuator contracts in the direction horizontal to the B-B' line.

Therefore, the facing surface of each unit of the long actuator portions is directed to the direction along the screw axis as in this embodiment, the spiral composite actuator 1 can be formed that is driven in the contraction direction along the screw axis before and after voltage application. Due to the structure of the spiral composite actuator 1, the generation of displacement in the contraction direction along the screw axis and the pulling force in the contraction direction can be achieved.

It is a matter of course that the structure can also be designed to return the state where the tube diameter is enlarged by bending, which is the state before the voltage application, to the flat state by the voltage application. In this case, the spiral composite actuator 1 can be formed that can be driven in an expansion manner along the screw axis Z.

It is also possible to form an expansion and contraction actuator that can arbitrarily perform extension operation and contraction operation, in which the state before voltage application is a state between the above-described two structures (state where the tube diameter is somewhat enlarged by bending) and the flat state is achieved by voltage application of one polarity and the bending state is achieved by voltage application of reverse polarity.

The process becomes easier than the case where the facing surface of each unit is wound perpendicularly to the screw axis. When the facing surface of each unit is wound around the screw axis as in this embodiment, a structure is achieved in which the connection members 4 are adjacent to each other. When the connection member 4 are formed so that the external conductive members 13 are provided on the external surface as illustrated in FIG. 4, there arise no problems when the connection members contact each other. The units of the long actuator portions may be connected with the adjacent connection members 4 or the units are not always necessarily connected insofar as the changes in the tube diameter of the spiral can be transmitted to the adjacent units.

When wound around the screw axis, a structure may be acceptable in which the facing surface of each unit is connected to each other.

According to this embodiment, a small and lightweight expansion and contraction actuator in which a strong sealing structure, peripheral devices, and the like as are seen in a fluid actuator are sharply omitted.

The changes in the tube diameter of the spiral occur in a synchronized manner irrespective of the stacking direction, and thus the movement becomes more uniform. Therefore, a portion to which load is likely to be applied in driving is canceled, and thus local material exhaustion can be reduced.

It is also possible to sharply simplify the structure of the electrical contact point for the integration of the polymer actuator, and thus the productivity is also excellent.

Third Embodiment

This embodiment is a modification of the first embodiment and has a structure in which the long actuator portions 2 and 3 are divided at arbitrary positions.

Figure 6:
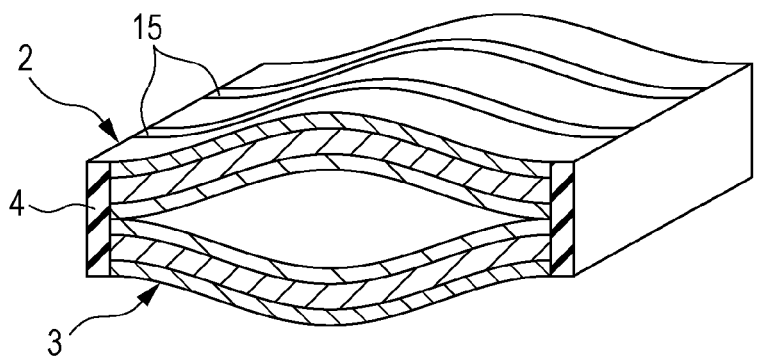
FIG. 6 is a general view illustrating the region II describing the structure of an actuator of a third embodiment of the invention and a portion continuous therefrom in the longitudinal direction.

FIG. 6 illustrates a unit of the long actuator portions and is a view illustrating the cross sectional region II illustrated in FIG. 1B and a portion continuous therefrom in the longitudinal direction.

In each of the long actuator portions 2 and 3, one or more slits 15 are formed at facing positions and divided. Here, the slits 15 refer to notches formed in the electrode layers and the long electrolyte layer constituting the long actuator portions and the three layers may be collectively cut or notches may formed only in the electrode layers. The ease of bending of a film depends on the cross sectional shape and a film having a smaller slit width is easily bended. Therefore, it is suitable to collectively cut the three layers. The width of the slits is arbitrarily determined. However, the slits become dead spaces of the spiral composite actuator, and therefore the width is suitably as small as possible.

The slits 15 may be formed in the direction perpendicular to the longitudinal direction of the long actuator portions 2 and 3 and may be formed in the direction having an arbitrary angle.

When at least one end is connected and fixed with the connection member 4, the slits may be positioned in the direction along the longitudinal direction.

The entire line of each of the divided actuators is regarded as each of the long actuator portion 2 and 3.

The slits 15 may be formed in one or more arbitrary portions of either one or both of the long actuator portions 2 and 3, and the slit positions may or may not be uniform. For the uniform movement of the spiral composite actuator 1, it is more suitable for the slits 15 to have regularity.

When the slits are formed in the long actuator portions 2 and 3, a conductive path of electrode layers (2a, 2c, 3a, 3c) is intermittently cut. Therefore, the connection members 4 suitably have one continuous structure having a conductive path as illustrated in FIG. 6.

In general, the ease of bending of a film depends on the cross sectional shape and a film having a smaller slit width is easily bended. Therefore, by providing the slits 15 in the long actuator portions 2 and 3 and dividing the same as in this embodiment, the movement of the long actuator portions in such a manner as to further enlarge the tube diameter is facilitated. Therefore, the spiral composite actuator 1 greatly expands and contracts along the screw axis.

Fourth Embodiment

This embodiment is a modification of the first embodiment, in which at least one portion of the electrode layers and the electrolyte layer constituting the long actuator portions 2 and 3 is formed with a film body containing polymer fibers.

Figure 7A:
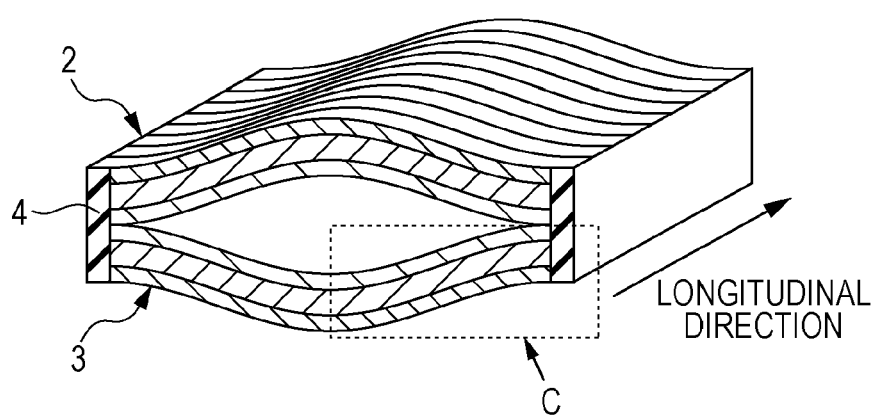
FIGS. 7A and 7B are general views illustrating the structure of a long actuator portion in a fourth embodiment of the invention.
Figure 7B:
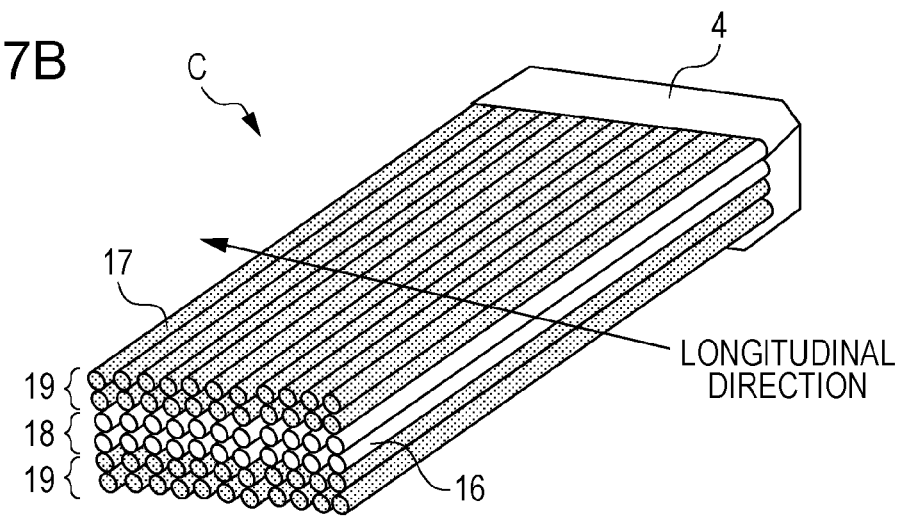

FIG. 7A illustrates a unit of the long actuator portions and is a view illustrating the cross-sectional region II illustrated in FIG. 1B and a portion continuous therefrom in the longitudinal direction and FIG. 7B is a view illustrating the structure of a region C of FIG. 7A.

In FIGS. 7A and 7B, a polymer fiber electrolyte layer 18 is a film body formed by the accumulation of electrolyte layer polymer fibers 16 and similarly polymer fiber electrode layers 19 are films each formed by the accumulation of electrode layer polymer fibers 17. It is illustrated that the polymer fibers of each layer are oriented in the direction perpendicular to the longitudinal direction.

The electrolyte polymer fibers 16 and the electrode layer polymer fibers 17 each are formed in the shape of a fiber using the above-mentioned materials. The electrolyte polymer fibers may also contain an electrolyte in the fibers or an electrolyte may permeate into the film body after film formation. The electrode layer polymer fibers 17 may contain a conductive material in the fibers or a conductive material may be disposed on the external surface of the fibers. Similarly, the fibers may contain an electrolyte in the fibers or an electrolyte may permeate thereinto after film formation.

Methods for producing the polymer fibers are not particularly limited and, for example, an electrospinning method, a composite spinning method, a polymer blend spinning method, a melt blow spinning method, a flash spinning method, and the like are mentioned. Among the above, the electrospinning method is suitably used because spinning of various polymers into a fiber shape can be performed, the fiber shape can be easily controlled, and nano size fibers can be obtained.

A method for manufacturing the polymer fibers by the electro spinning method is performed using a high-pressure power supply, a polymer solution, a storage tank, a spinning opening, and a grounded collector. The polymer solution is pushed out at a fixed rate from the tank to the spinning opening. To the spinning opening, a voltage of 1 to 50 kV is applied. When the electrical attraction exceeds the surface tension of the polymer solution, a polymer solution jet is injected to the collector. In this case, the solvent in the jet gradually evaporates, and when the jet reaches the collector, the jet size decreases to a nano level. Then, a polymer fiber layer is formed in the collector.

Methods for orienting the polymer fibers are not particularly limited and known techniques can be used as appropriate or can be combined in some cases. For example, in the above-described electrospinning method, polymer fibers that are oriented in the same direction in the plane can be produced by performing continuously spinning while winding using a rotation drum capable of winding fibers as the collector.

The polymer fibers for use in the electrolyte layer and the electrode layers may be oriented in such a manner as to be directed in the same direction or may be randomly deposited.

The polymer fiber layer may be a multilayer. In this case, the orientation direction between different layers may be the same or different. For example, it is also possible to further increase the mechanical strength of a polymer actuator by forming a network structure in which at least one layer is oriented in the longitudinal direction and at least one other layer is oriented in the direction perpendicular to the longitudinal direction.

In the polymer fiber, the length is sufficiently longer than the diameter. When formed by the electrospinning method, the polymer fiber can be manufactured in such a manner that the diameter is 0.01 μm or more and 50 μm or lower. When the fiber diameter is smaller, the charge amount per volume can be flexibly adjusted. Therefore, the diameter is more suitably 0.05 μm or more and 1 μm or lower.

In particular, when the polymer fiber long electrolyte layer 18 and the polymer fiber electrode layers 19 are oriented in the direction perpendicular to the longitudinal direction as illustrated in FIGS. 7A and 7B, the mechanical strength in the direction in which the long actuator portions 2 and 3 bend, i.e., bending in the orientation direction, becomes high. Therefore, a structure is achieved in which force is easily drawn as a film. Therefore, the generative force of the spiral composite actuator 1 becomes high.

When the polymer fiber long electrolyte layer 18 and the polymer fiber electrode layers 19 are relatively oriented in the direction along the longitudinal direction, the mechanical strength in the direction in which the long actuator portions 2 and 3 bend, i.e., bending in the orientation direction, becomes low. Therefore, a structure is achieved in which displacement is easily caused as a film. Therefore, the displacement amount of the spiral composite actuator 1 becomes large.

Therefore, according to this embodiment, the mechanical strength to bending can be arbitrarily adjusted depending on the orientation direction, and thus the displacement amount or the generative force as an actuator can be adjusted to some extent.

In addition, by forming the long electrolyte layer or the electrode layers with the polymer fibers as in this embodiment, the present ratio of voids in a film can be made larger than a bulk film body formed by a cast method.

When the size of voids is larger and the number of voids is larger, the movement of the electrolyte is facilitated. Therefore, it becomes possible to increase the properties of the polymer actuator.

Therefore, according to this embodiment, it is possible to increase the expansion and contraction amount and the generative force of the spiral composite actuator 1 as compared with one employing a polymer actuator containing a bulk film body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-177315 filed Aug. 6, 2010, which is hereby incorporated by reference herein in its entirety.

What is claimed is:

1. A composite actuator, which is a long and spiral composite actuator, the composite actuator, comprising:
   a first long actuator portion and a second long actuator portion that face each other; and
   connection members that connect the long sides of each of the first long actuator portion and the second long actuator portion to each other,
   a part of the first long actuator portion and a part of the second long actuator portion being apart from each other to thereby form a hollow structure,
   the first long actuator portion and the second long actuator portion each having a pair of long electrodes and a long electrolyte layer having an electrolyte,
   a long internal electrode of the first long actuator portion and a long internal electrode of the second long actuator portion being the same cathode or anode electrodes,
   a long external electrode of the first long actuator portion and a long external electrode of the second long actuator portion being counter electrodes to the cathode or anode electrodes, and
   the actuator expanding and contracting in the direction of the screw axis by voltage application between the electrodes.

2. The composite actuator according to claim 1, wherein a facing surface where the first long actuator portion and the second long actuator portion face each other is perpendicular to the screw axis.

3. The composite actuator according to claim 1, wherein a facing surface where the first long actuator portion and the second long actuator portion face each other is in parallel to the screw axis.

4. The composite actuator according to claim 1, wherein one or more slits are formed in at least one of the first long actuator portion and the second long actuator portion.

5. The composite actuator according to claim 1, wherein the connection member has a conductive path for energizing the long external electrode and/or the long internal electrode.

6. The composite actuator according to claim 1, wherein the composite actuator is formed with a polymer actuator at least containing a carbon nanotube and an ionic liquid.

* * * * *